Aug. 30, 1949.  P. W. STUTSMAN  2,480,684
ELECTRICAL CIRCUITS
Filed Feb. 20, 1947  2 Sheets-Sheet 2
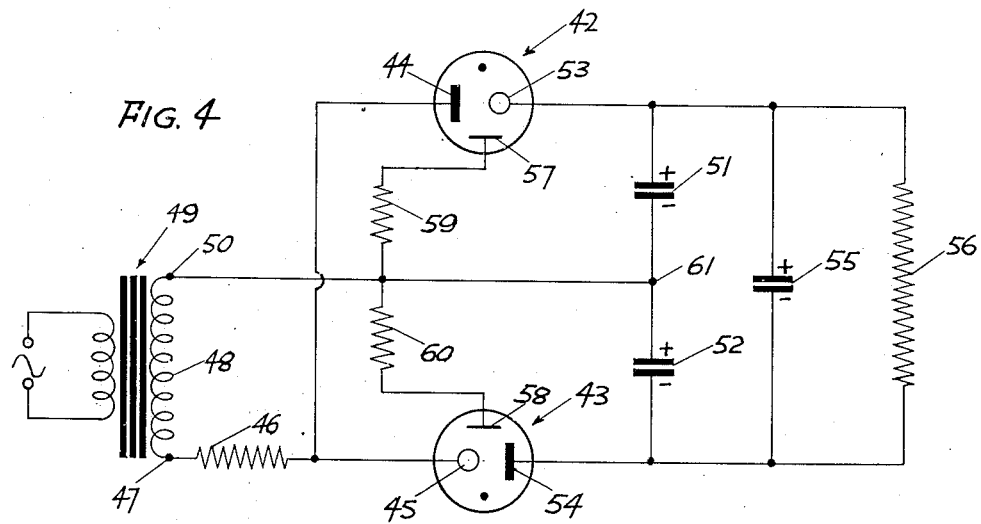
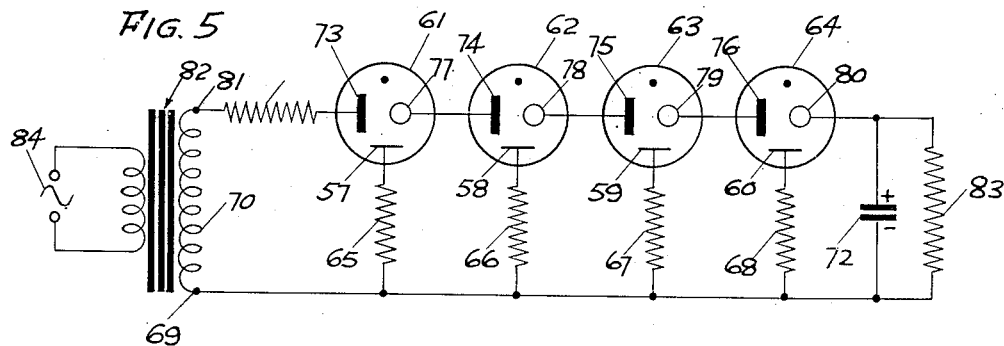
INVENTOR
PAUL W. STUTSMAN
BY
ATTORNEY Patented Aug. 30, 1949

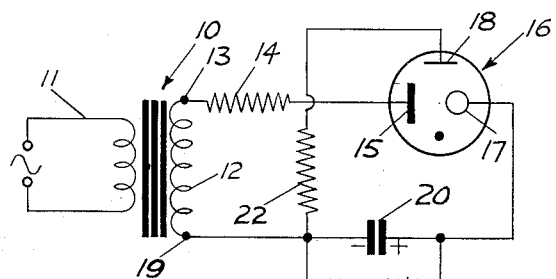
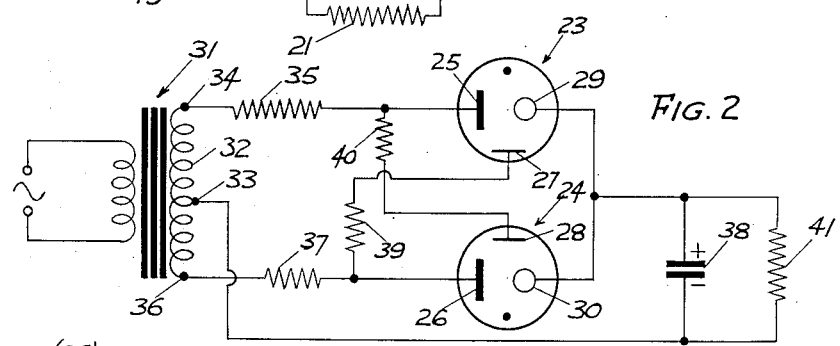
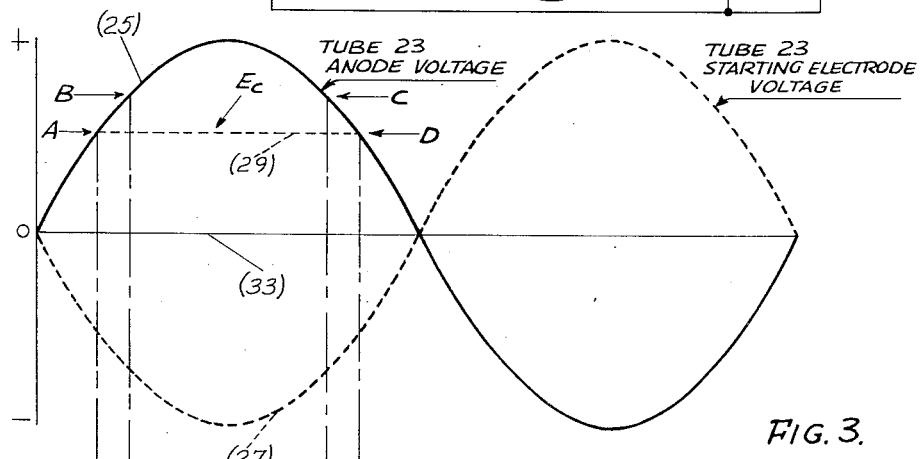
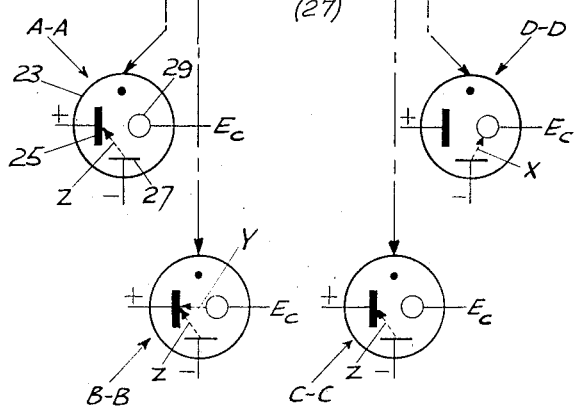

2,480,684

UNITED STATES PATENT OFFICE 2,480,684

ELECTRICAL CIRCUITS

Paul W. Stutsman, Needham, Mass., assignor to Raytheon Manufacturing Company, Newton, Mass., a corporation of Delaware Application February 20, 1947, Serial No. 729,826

7 Claims. (Cl. 315—239)

This invention relates to electrical circuits and more particularly to rectifying circuits employing gaseous discharge devices of the cold cathode type.

It is an object of the present invention to provide circuit means adapted to employ cold cathode tubes of the type disclosed in the copending application of Paul W. Stutsman, Serial No. 647,463, filed February 14, 1946, now Patent No. 2,435,246, dated February 3, 1948.

The above and other objects will present themselves as the description of the illustrative embodiments of the present invention progresses and by reference to the accompanying drawing, in which:

Fig. 1 is a schematic diagram of a half-wave rectifying circuit embodying the present invention;

Fig. 2 illustrates a schematic diagram of a full-wave rectifying circuit including the embodiment of the present invention;

Fig. 3 is a combined graph and pictorial view of various phases of conduction in a gas-filled rectifier tube;

Fig. 4 depicts a schematic diagram of a combination rectifying and voltage doubling circuit embodying the present invention; and Fig. 5 shows the use of the present invention in connection with a series type rectifying circuit.

Referring now more particularly to Fig. 1, the reference numeral 10 refers to a transformer having a primary winding 11 energized by a source of alternating current and a secondary winding 12 capable of, for example, transforming the voltage of said source to a higher value. One end 13 of said transformer is connected, through a current limiting resistor 14 to the anode 15 of a gas-filled cold cathode rectifier tube 16 of the type disclosed in the aforementioned copending application, Serial No. 647,463. Positioned within said tube 16 is a cooperating cathode 17 and a starting electrode 18. The other end 19 of the transformer secondary 12 is connected through a capacitor 20 to the cathode 17 of said tube. Shunted across said capacitor 20 is a resistor 21 which serves to represent any desired load adapted to be energized by the rectified output of said tube 16. A second current limiting resistor 22 is connected from the starting electrode 18 to a point intermediate the end 19 of the secondary winding 12 and the negative side of the capacitor 20. This arrangement, even when the primary end 19 is positive, makes the starting electrode 18 operate as a cathode with respect to the cathode 17. Since said electrode 18 is connected to the negative terminal of the capacitor 20, the actual cathode 17 is connected to the positive terminal of said capacitor. Therefore, said starting electrode has impressed on it a biasing voltage. It has been found that by connecting the current limiting resistor 22 in the manner above described, there is secured an output across the load 21 that is steady and free of erratic operation or flutter, under conditions where such, heretofore, has been unattainable. It is believed that some current flows between starting electrode 18 and the cathode 17 during part of the cycle, and during the balance of the cycle current flows between the starting electrode 18 and the anode 15. In effect some current is flowing in the tube 16 at all times when the circuit is energized to a steady state. Therefore, the circuit provides a steady filtered output substantially free from erratic operation. Utilizing two tubes and a center-tapped transformer, the circuit may be adapted for full wave rectification by connecting the starting electrode through a pair of resistors to the center-tap of a transformer.

Fig. 2 illustrates the use of the present invention in connection with a full wave rectifier employing two cold cathode gas-filled rectifiers 23 and 24 having, respectively, anodes 25 and 26, starting electrodes 27 and 28 and cathodes 29 and 30.

Said tubes 23 and 24 are energized by the alternating current output of a transformer 31, said transformer in this particular embodiment having a secondary winding 32 with a center tap 33.

The end 34 of said secondary winding is connected through a current limiting resistor 35 to the anode 25 of the tube 23. Said resistor 35 serves to cushion the current surge in the anode 25 circuit when initially put into operation. The opposite end 36 of said primary is connected, through a second surge current limiting resistor 37, to the anode 26 of the second tube 24, said resistor serving the same function as explained above.

The cathodes 29 and 30 are connected to the positive terminal of a capacitor 38, the negative terminal of said capacitor being connected to the center tap 33 of the transformer 31, said capacitor serving to further filter the rectified current output of the tubes 23 and 24.

A third current limiting resistor 39 is connected, preferably, between the starting electrode 27 and a point intermediate the anode 26 and its associated current limiting resistor 37, and a fourth current limiting resistor 40 is connected between the starting electrode 28 and the anode 25 of the first tube 23. However, connecting the resistor 39 intermediate the end 36 of the primary 32 and the resistor 37 will also provide the same results. Resistor 40 will, of course, be connected similarly with respect to the resistor 35 and end 34 of said primary winding. Across the capacitor 38 is shunted a load 41, adapted to utilize the rectified output of the tubes 23—24.

Fig. 3 serves to illustrate the various phases of current conduction taking place within the time space of a half cycle of applied voltage, for example, on the anode 25 of the tube 23. Conversely the same sequence of events takes place in connection with the tube 24. The starter electrode sine wave voltage is represented by the broken line sine wave curve, said wave being substantially 180° out of phase with the anode 25 voltage curve which is represented by the solid line sine wave. Said starter electrode 27 voltage is thus represented as being negative with respect to the center tap 33 for half a cycle, while the anode voltage is positive for the same half cycle.

Let it be assumed that the voltage on the anode 25 of tube 23 has risen to a point A on said sine voltage curve. This particular point represents the maximum charge $E_c$ on the condenser 38, and it is substantially equal to the peak output of the transformer 31 less the voltage drop across said tube. The schematic drawing A—A of tube 23 indicates the conduction condition of said tube. The dotted line arrow Z indicates the electron flow at this phase of the anode voltage, the anode 25 being sufficiently positive with respect to the starter electrode 27 to cause ionization to take place between said last-named elements. As the anode voltage continues to rise to the point B, the difference in potential between A and B is now sufficient to cause ionization to take place between the anode 25 and the cathode 29, as indicated by the dotted line arrow Y in the tube schematic B—B. This represents the main discharge phase and same continues until point C on said voltage curve. As the anode voltage at point C becomes less positive, conduction between the anode and cathode ceases, as indicated in the tube schematic C—C, and this condition continues for the period between points C and D on said anode voltage curve. This last-named condition occurs because the potential between points C and D is now insufficient to sustain the main discharge between said anode and cathode.

At point D, conduction between the starting electrode 27 and the anode 25 shifts to conduction between said starting electrode and the cathode 29, as illustrated in the tube schematic D—D, conduction being indicated by the dotted line arrow X. At this phase of the anode voltage, the capacitor charge $E_c$, impressed on the cathode 29 is more positive with respect to the starting electrode 27 than is the anode 25, and so accounts for the shift of conduction away from said anode.

In Fig. 4 there is illustrated a voltage doubling circuit embodying the present invention. A pair of gas-filled rectifying tubes 42 and 43 are connected, in this particular embodiment, to provide a full-wave voltage doubling circuit, the anode 44 of the tube 42 and the cathode 45 of tube 43 being connected, through a current limiting resistor 46, to the end 47 of the secondary winding 48 of a transformer 49. The opposite end 50 of said transformer is connected to a point 61, intermediate a pair of capacitors 51 and 52, the positive terminal of the capacitor 51 being connected to the cathode 53 of the tube 42 and the negative terminal of capacitor 52 to the anode 54 of the tube 43. Shunted, respectively, across the positive and negative terminals of the capacitors 51 and 52 is a filter capacitor 55, and shunt-connected across the terminals of said last-named capacitor is a load 56 adapted to be energized by the rectified output of the tubes 42—43.

A pair of starting electrodes 57 and 58 is connected, respectively, through a pair of current limiting resistors 59 and 60 to a point 61 intermediate the pair of capacitors 51—52. This particular arrangement is similar, generally, to the circuit described in connection with Fig. 1 with the exception of the starting electrode 58 of tube 43. The last-named electrode functions with respect to the cathode 45 as an anode. This particular circuit represents a combination, in a full wave rectifier, of cathode and anode rectification. The starting electrode 57 is biased negatively while the starting electrode 58 is biased positively. Therefore, starting electrode 57 of tube 42 functions in the same manner as described in connection with the circuit of Fig. 1.

When a main discharge takes place in the tube 42, current flows therethrough and tends to charge the capacitor 51 to a voltage equal to the peak value of the voltage across the primary 48 less the voltage drop through said tube 42. The polarity of said charged capacitor is then as indicated in the diagram. During this half cycle of the transformer voltage, the anode 54 of the tube 43 is negative, and substantially no current passes therethrough.

When the polarity of the transformer voltage reverses, current flows from the point 50, which is now positive, through the tube 43 and capacitor 52 back to the opposite end 47 of the primary 48. Now capacitor 52 tends to be charged to a voltage equal to the voltage across said primary less the voltage drop across the tube 43, the polarity of said capacitor being indicated in said diagram.

The voltage presented to the filter capacitor is the potential difference between the positive terminal of capacitor 51 and the negative terminal of capacitor 52.

In Fig. 5 there is illustrated a series-connected rectifying circuit which is readily adapted to rectify the output of high-voltage transformers, such as are employed in connection with electron-microscopes, X-ray machines, precipitators, circuits employing high voltage cathode-ray tubes, etc.

In many of the aforesaid applications of the illustrative embodiment represented by Fig. 5, it is important that the rectified output be substantially constant. Therefore, the utilization of the present invention, as exemplified by said schematic diagram, readily provides this desirable quality.

As illustrated in Fig. 5, the starting electrodes 57, 58, 59 and 60 of a plurality of gas-filled rectifying tubes 61, 62, 63 and 64 are connected, respectively, through current limiting resistors 65, 66, 67 and 68 between the end 69 of the secondary winding 70 of a high voltage transformer 82 and the negative terminal of a filter capacitor 72. Each of the aforementioned tubes are supplied, respectively, with anodes 73, 74, 75 and 76 together with cooperating cathodes 77, 78, 79 and 80.

The anode 73 is connected through a current limiting resistor to the other end 81 of the secondary winding 70. From said tube 61 the respective cathodes 77—79 are connected in series to the respective anodes 74—76 of the tubes 62—64. The cathode 80 of the tube 64 is connected to the positive terminal of the capacitor 72 and shunted across said capacitor is a load 83 adapted to be energized by the rectified output of aforesaid tubes.

When the transformer 82 is energized by a source of alternating voltage 84, the high voltage across the secondary of said transformer distributes itself substantially equally across said tubes. Of course it should be understood that the number of tubes required to rectify the output voltage of the transformer must be determined in accordance with the requirement that each tube should be capable of handling safely its proportion of said voltage. For example, if the output across the secondary winding 70 was of the order of 4000 volts, each tube must safely handle 1000 volts each. In addition, assuming that for one tube the current limiting resistor in the starting electrode circuit is ten megohms and the entire series circuit includes, as illustrated, four tubes, the following equations will determine the proper current limiting resistance for each tube as follows:

Resistor $65 = (10 \text{ megohms})(2N-1)$
Resistor $66 = (10 \text{ megohms})(2N-2)$
Resistor $67 = (10 \text{ megohms})(2N-3)$
Resistor $68 = (10 \text{ megohms})(2N-n)$ where, within the second parenthesis:

The integer two is a constant; N equals the number of tubes in series; and $-1, -2, -3$ and $-n$ is the tube number or position when reading from left to right on the schematic, Fig. 5.

As in the circuit described in connection with Fig. 1, the manner in which the current limiting resistors are connected provides an output across the load 83 that is steady and free of erratic operation or flutter.

Having described the invention, it will be obvious that many modifications thereof are possible, and it is, therefore, intended to cover by the appended claims all such modifications which fall within the true spirit and scope of this invention.

What is claimed is:

1. A rectifying circuit comprising: a space discharge device having an anode, a cathode and a starting electrode; means for energizing said space discharge device; and means for causing current to flow substantially continuously in said device, comprising means for maintaining said starting electrode at a substantially steady negative potential with respect to said cathode.

2. A rectifying circuit comprising: a space discharge device having an anode, a cathode and a starting electrode; means for energizing said space discharge device; and means, adapted to be energized by said last-named means, for impressing a negative bias on said starting electrode, whereby current is caused to flow substantially continuously in said device.

3. A rectifying circuit comprising: a space discharge device having an anode, a cathode and a starting electrode; means for energizing said space discharge device, said means including a transformer having a secondary winding; means for connecting, respectively, said anode and starting electrode to the respective ends of said secondary winding; and means for connecting said cathode through a capacitor to said starting electrode.

4. A rectifying circuit comprising: a space discharge device having an anode, a cathode and a starting electrode; means for energizing said discharge device; a capacitor connected intermediate the cathode of said discharge device and one terminal of said energizing means; means for connecting the other terminal of said energizing means to the anode of said discharge device; and current limiting means connected between said starting electrode and the first-named terminal of said energizing means.

5. A rectifying circuit comprising: a plurality of space discharge devices having, respectively, an anode, a cathode and a starting electrode; means for energizing said discharge devices, said means including a transformer having a primary and a center-tapped secondary winding, said primary being connected to a source of alternating current; a capacitor connected from its positive terminal to the respective cathodes of said discharge devices and from its negative terminal to the center tap of said secondary winding; means connecting the end terminals of said secondary winding to the respective anodes of said discharge devices; and current limiting means connected, respectively, between the starting electrode of a first of said discharge devices and the anode of a second of said discharge devices and between the starting electrode of said second-named discharge device and the anode of said first-named discharge device.

6. A rectifying circuit comprising: a plurality of space discharge devices having, respectively, an anode, a cathode and a starting electrode; means for energizing said discharge devices; a pair of series-connected capacitors connected intermediate the cathode of a first of said discharge devices and the anode of a second of said discharge devices; means for connecting one terminal of said energizing means to the anode and cathode, respectively, of said first and second-named discharge devices and the other terminal of said energizing means to a point intermediate said pair of capacitors; and current limiting means connected, respectively, to the starting electrodes of said discharge devices and the free ends thereof to a point intermediate said capacitors.

7. A rectifying circuit comprising: a plurality of space discharge devices having, respectively, an anode, a cathode and a starting electrode, said discharge devices being connected in series; a source of alternating current for energizing said gaseous discharge devices; a capacitor connected from its negative terminal, to one terminal of said current source; means for connecting the other terminal of said current source to the anode of said first series-connected discharge device and the positive terminal of said capacitor to the cathode of the last of said series-connected discharge devices; and current limiting means connected between the respective starting electrodes of said discharge devices and the negative terminal of said capacitor.

PAUL W. STUTSMAN.

REFERENCES CITED

The following references are of record in the file of this patent:

UNITED STATES PATENTS

| Number | Name | Date |
| --- | --- | --- |
| 1,046,086 | Kraus | Dec. 3, 1912 |
| 1,289,099 | Brackett | Dec. 31, 1918 |
| 2,064,021 | Ludwig | Dec. 15, 1936 |
| 2,190,552 | Swart | Feb. 13, 1940 |